(12) United States Patent
Dale et al.

(10) Patent No.: US 8,857,215 B2
(45) Date of Patent: Oct. 14, 2014

(54) APPARATUS AND METHOD FOR HEAT TREATING GLASS SHEETS

(75) Inventors: George O. Dale, Horseheads, NY (US); Juergen Tinz, Addison, NY (US)

(73) Assignee: Corning Incorporated, Corning, NY (US)

( * ) Notice: Subject to any disclaimer, the term of this patent is extended or adjusted under 35 U.S.C. 154(b) by 268 days.

(21) Appl. No.: 13/473,130

(22) Filed: May 16, 2012

(65) Prior Publication Data
US 2012/0324950 A1     Dec. 27, 2012

Related U.S. Application Data

(60) Provisional application No. 61/487,454, filed on May 18, 2011.

(51) Int. Cl.
*C03B 29/10*     (2006.01)

(52) U.S. Cl.
CPC ...................................... *C03B 29/10* (2013.01)
USPC ....................... 65/119; 65/95; 65/117; 65/118

(58) Field of Classification Search
CPC .............................. C03B 25/087; C03B 29/10
USPC ...................................... 65/95, 117, 118, 119
See application file for complete search history.

(56) References Cited

U.S. PATENT DOCUMENTS

| | | | | |
|---|---|---|---|---|
| 1,585,542 A | * | 5/1926 | Henry ............................. | 65/117 |
| 3,002,321 A | * | 10/1961 | Dunipace et al. ............... | 65/119 |
| 3,318,673 A | * | 5/1967 | Fuller et al. ..................... | 65/118 |
| 4,105,420 A | | 8/1978 | Moore ............................. | 55/274 |
| 4,135,906 A | * | 1/1979 | Gladieux et al. ................ | 65/348 |
| 4,481,025 A | * | 11/1984 | Rodriguez et al. .............. | 65/348 |
| 5,332,080 A | * | 7/1994 | Lenhardt et al. ............... | 198/497 |
| 5,771,778 A | | 6/1998 | MacLean, IV ............... | 99/323.6 |
| 7,363,777 B2 | | 4/2008 | Davidson ........................ | 65/111 |
| 2005/0193772 A1 | | 9/2005 | Davidson ........................ | 65/111 |
| 2007/0267312 A1 | | 11/2007 | Coppola et al. ................ | 206/454 |

FOREIGN PATENT DOCUMENTS

WO    WO92/22427    12/1992    ............. B32B 17/10

\* cited by examiner

*Primary Examiner* — Queenie Dehghan
(74) *Attorney, Agent, or Firm* — Kevin M. Able

(57) ABSTRACT

Disclosed is an apparatus and method for heat treating glass sheets, and in particular for heat treating very thing glass sheets arranged in closely spaced stacks. The glass sheets are positioned on a moving belt such that their major surfaces are substantially perpendicular to a direction of belt travel through the apparatus to aid in producing a uniform temperature profile within the glass sheets. The apparatus comprises air curtains positioned at the inlet and outlet of the apparatus to minimize the ingress of particulate into the apparatus. A reduced velocity of heated air flow within a lower portion of the apparatus relative to a velocity of the heated air in an upper portion of the apparatus causes particulate to drop out of the lower portion air flow. A rotating brush and vacuums positioned adjacent a lower portion of the belt assist in removing particulate from the moving belt.

14 Claims, 2 Drawing Sheets

APPARATUS AND METHOD FOR HEAT TREATING GLASS SHEETS

CROSS-REFERENCE TO RELATED APPLICATIONS

This application claims the benefit of priority under 35 U.S.C. §119 of U.S. Provisional Application Ser. No. 61/487,454 filed on May 18, 2011, the entire content of which is hereby incorporated by reference.

BACKGROUND

1. Field

The present invention related to an apparatus for heat treating glass substrates, and in particular to an apparatus that reduces particulate contamination of closely stacked glass sheets while performing a heat treating process.

2. Technical Background

The fusion draw process produces glass that has been cooled rapidly, particularly below the annealing point. As a result, compaction may occur during heat treatments subsequent to the initial manufacturing phase such as during an ion exchange processes. The consequence is un-acceptable dimensional change and undesirable, reduced compressive stress resulting from the chemical tempering. Thicker wall glass articles have been previously successfully heat treated in annealing lehrs, box kilns, ovens or other heat treatment equipment. To date, success with this process for thin glass sheets has not been achieved due to deformation, abrasion, contamination or other degradation of the glass surface.

SUMMARY OF THE INVENTION

Disclosed herein is an apparatus that can improve the value of glass sheets by reducing or eliminating undesirable glass properties produced by rapid cooling. Specifically it can be used to reduce the degree of compaction, dimensional changes, or structural relaxation of the glass sheet that may occur during subsequent processing of the glass, such as chemical tempering in an ion exchange process. The apparatus can be used to enhance the compressive stress attainable by a chemical tempering process.

Temperature uniformity is obtained by direct forced convection between glass sheets. Contamination of the glass sheets is minimized or avoided by careful selection of heat treatment equipment construction materials, a down draft convective heating and cooling system with special provisions for capturing and separating entrained particles from the airstream. The apparatus provides for improved thermal uniformity by utilizing convection heating, and improved contamination performance by utilizing filtered heating air and internal heat treat equipment design compared to other heat treat processes.

The use of convection heating of the glass sheets provides for thermal uniformity both within a glass sheet and between adjacent glass sheets. This provides consistent dimensional performance of the glass in both the heat treat process and a subsequent ion exchange process. Treatment time and temperature cycles applied to glass sheets as disclosed herein also provide significantly higher compressive stress after an ion exchange process compared to as-drawn glass without heat treatment. Convection heating allows for reduced heat treatment time compared to processes utilizing radiant heating, and the use of filtered air and equipment design minimizes entrained particles in the convective heating airstream, allowing for a reduction in the number of surface defects.

Spacing of the individual glass sheets is selected to minimize flow boundary conditions that could cause unacceptable temperature non uniformity within the sheet, and temperature uniformity is enhanced by orienting the glass sheets such that the glass traversing the lehr temperature gradients does so through the thickness of the glass sheets. That is, the major surfaces of the glass sheets are oriented to be perpendicular to the direction of motion of the glass sheets as they travel through the apparatus.

In some embodiments the glass sheets may be cleaned by a pre-washing and subsequent drying step prior to entering the apparatus.

To reduce particulate within the apparatus, air introduced to the interior of the apparatus is filtered to HEPA class 1000 clean room standards. Down draft forced convection is used in combination with a low air velocity produced in the lower portion of the apparatus, below the belt that moves the glass sheets through the apparatus, separates any particulate from the air stream and allows the separated particulate to settle in the lower portion of the apparatus where it can be later removed. In addition, brush and vacuum equipment clean the returning belt before it reaches a top horizontal position. A guard device located on the shaft of each fan motor used to produce an air flow within the apparatus, in conjunction with shaft seals positioned where each shaft penetrates the apparatus, prevents lubricant from reaching the interior of the enclosure.

Heating of the glass sheets within the apparatus is done at a rate that prevents crack propagation from the "as-cut" edges. That is, in a fusion downdraw process a glass ribbon is formed that descends vertically from a forming body. Individual glass sheets are formed by cutting the ribbon transversely to the draw direction, thus forming two opposing and generally parallel cut edges. In addition, the fusion downdraw process produces enlarged edge portions on the ribbon. These enlarged edge portions, or beads, are generally perpendicular to the cuts used to separate the individual glass sheets from the glass ribbon, and must be removed from the glass sheet. So two additional cut edges are formed generally perpendicular to the first cut edges. Initial heating of the glass sheets may be performed at a rate from about 1° C./min to about 450° C./min, from about 5° C./min to about 450° C./min, from about 20° C./min to about 450° C./min, from about 1° C./min to about 100° C./min, from about 5° C./min to about 100° C./min or from about 20° C./min to about 100° C./min.

Once the glass sheets reach a maximum temperature, they are maintained at the maximum (hold) temperature for a predetermined amount of time (hold time) to provide the opportunity for the glass structure to relax to a more compact form, thereby resulting in greater dimensional stability in a subsequent thermal cycle, as may be found for example, in an ion exchange process. Combined with a subsequent ion exchange process suing the apparatus disclosed herein can produce glass sheets with a higher surface compressive stress potential. The hold temperature may be in the range from about 25° C. to about 45° C. below the anneal temperature of the glass, wherein the anneal temperature is the temperature at which the glass has a viscosity of $10^{13}$ Poise. In some embodiments the hold time may be in the range from about 5 minutes to about 120 minutes, from about 30 minutes to about 120 minutes; from about 5 minutes to about 60 minutes, or from about 5 minutes to about 30 minutes.

After the hold period, the glass sheets are cooled at a rate that prevents the re-introduction of the undesirable glass structure that has been re-ordered by the heat treat process. The cooling rate is initially gradual and then increased consistent with the above objective. In some embodiments the initial slow cool rate may be in the range from about 1° C./minute to about 5° C./min until the glass is below a strain temperature, where the strain temperature is the temperature at which the glass reaches a viscosity of $10^{14.5}$ Poise. During an intermediate cooling period the glass sheets may be cooled at a rate in the range from about 5° C./min to about 10° C./min or from about 5° C./min to about 20° C./min. During a final stage of cooling, the glass sheets may be cooled at a rate in the range from about 5° C./min to about 50° C./min or from about 5° C./min to about 20° C./min.

Accordingly, disclosed herein is an embodiment of an apparatus for heat treating glass sheets comprising an enclosure comprising an outer wall and an inner wall, wherein a space between the inner wall and the outer wall forms a plenum through which air circulates and a belt arranged in a continuous loop positioned within the enclosure. The belt is configured to move within the enclosure and comprises an open porosity sufficient to allow a flow of air therethrough. The apparatus further comprises a plurality of fans for directing a flow of air downward from an upper portion of the enclosure through the belt into a lower portion of the enclosure. A rotatable brush may be placed in contact with a lower portion of the belt, and may be paired with least one vacuum inlet positioned adjacent to the brush. In some embodiments, a plurality of vacuum inlets may be positioned adjacent to the brush. The plurality of fans are connected to a plurality of drivers, such as electric motors, and the shafts of the plurality of drivers preferably comprise shields extending radially outward from the shafts to prevent lubricant that may drip from the drivers from entering the enclosure and contaminating the glass. In addition, the shafts of the plurality of drivers can include sleeves positioned around the shafts where the shafts penetrate the enclosure.

To reduce the velocity of the air being directed downward through the apparatus from carrying particulate through the enclosure, a volume of the enclosure below the belt is greater than a volume of the enclosure above the belt. Thus, as the velocity of the air flow reduces, particulate within the air flow falls to the bottom of the enclosure.

In another embodiment, a method of heat treating glass sheets is described comprising transporting a plurality of glass sheets through an enclosure on a continuously moving belt, the plurality of glass sheets being oriented in an upright position such that major surfaces of the glass sheets are substantially perpendicular to the direction of transport. A flow of heated air is directed between the glass sheets, wherein the heated air heats the glass sheets to a hold temperature. Once the glass sheets reaches the hold temperature, the temperature of the glass sheets is maintained at the hold temperature for a predetermined period of time, the hold time. At the completion of the hold time, the glass sheets are cooled. During transportation of the glass sheets through the heat treating apparatus, the belt is cleaned by a rotating brush in contact with the belt to remove particulate that might be carried around the belt and potentially contaminate the surfaces of the glass sheets.

In some embodiments the heating rate during the process of heating up the glass sheets is greater than about 1° C./min. In other embodiments the heating rate is equal to or greater than about 5° C./min. In still other embodiments the heating rate is equal to or greater than about 20° C./min. In other embodiments, the heating rate is in a range from about 5° C./min to about 100° C./min. In some embodiments, the heating rate is in a range from about 20° C./min to about 100 C/min.

Preferably, the hold temperature is in a range from about 25° C. to about 45° C. below an anneal temperature of the glass sheets. In some embodiments glass sheets are held at the hold temperature for a predetermined period of time in the range from about 5 minutes to about 120 minutes. In other embodiments, the predetermined period of time is in the range from about 30 minutes to about 120 minutes. In still other embodiments, the predetermined period of time is in the range from about 5 minutes to about 60 minutes. In still other embodiments, the predetermined period of time is in the range from about 5 minutes to about 30 minutes.

Once the holding cycle, where the glass sheets are held at a hold temperature for a predetermined period of time, the glass sheets are cooled. In some embodiments, the cooling rate comprises a plurality of cooling rates. For example, in some embodiments, the cooling rate comprises an initial coiling rate in a range from about 1° C./min to about 5° C./min. In other embodiments, the cooling rate comprises an intermediate cooling rate in a range from about 5° C./min to about 20° C./min. In still other embodiments, the cooling rate comprises an intermediate cooling rate in a range from about 5° C./min to about 10° C./min. In some embodiments, the cooling rate comprises a final cooling rate in a range from about 5° C./min to about 50° C./min. In other embodiments, the cooling rate comprises a final cooling rate in a range from about 5° C. top about 20° C.

To prevent particulate from entering the open ends of the apparatus, an air curtain is produced at least at one opening of the enclosure in some embodiments. For example, in some embodiments, an air curtain is produced at an inlet of the enclosure. In other embodiments, an air curtain is produced at an outlet of the enclosure. Preferably, an air curtain is produced at both the inlet opening and the outlet opening of the enclosure.

To prevent the air pulled from outside the enclosure and used as a recirculating heated air within the enclosure from carrying particulate from outside the enclosure to inside the enclosure, the air is preferably a filtered air. That is, preferably, the air is filtered prior to entering the enclosure. In some embodiments, a velocity of the heated air in a lower portion of the enclosure is lower than a velocity of the heated air in an upper portion of the enclosure. Preferably, a distance between a major surface of a first glass sheet of the plurality of glass sheets and a major surface of an adjacent glass sheet of the plurality of glass sheets is in a range from about 1 cm to about 2 cm.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and constitute a part of this specification. The drawings illustrate various embodiments of the invention and, together with the description, serve to explain the principles and operations of the invention.

DETAILED DESCRIPTION

Figure 1:
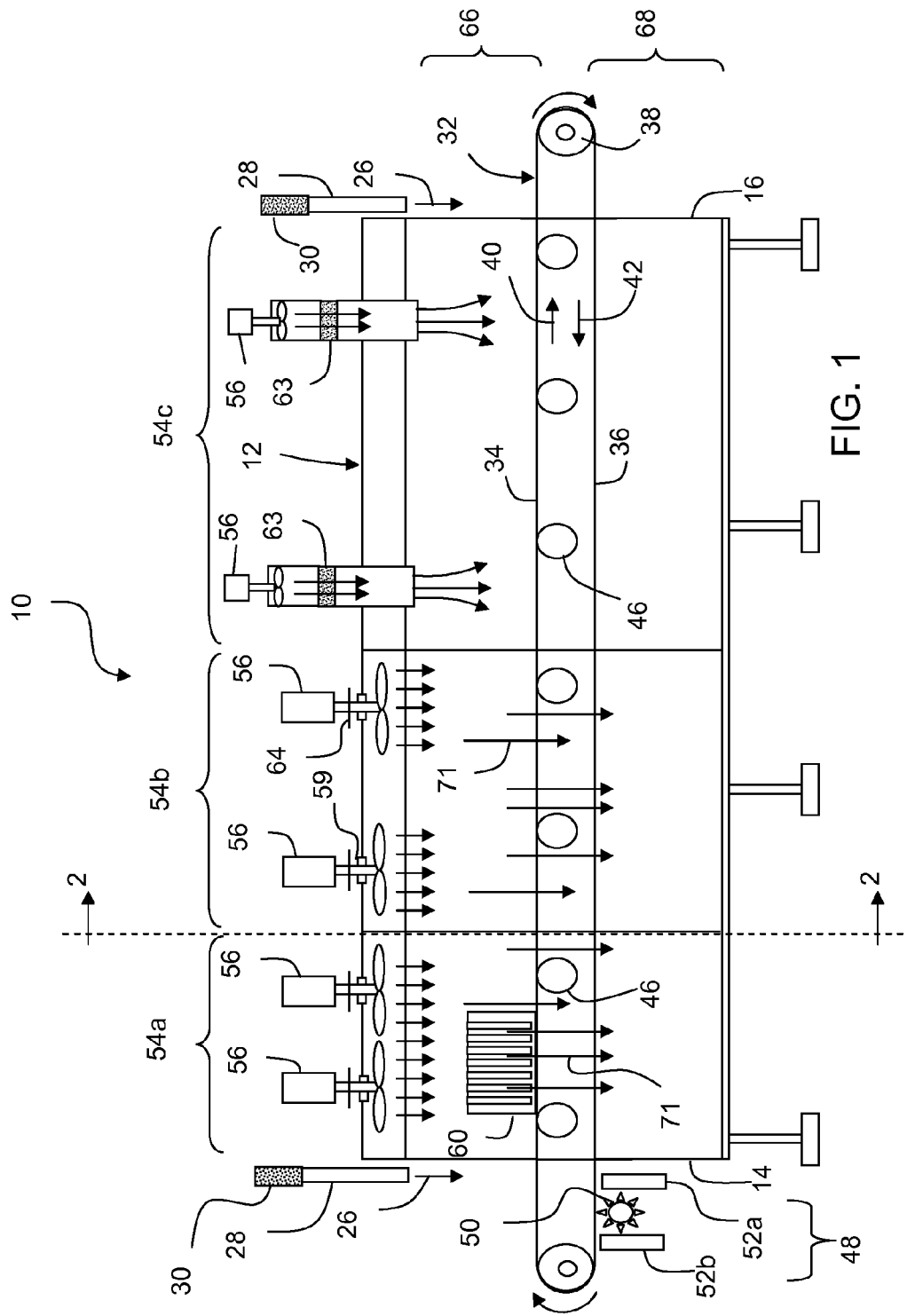
FIG. 1 is longitudinal cross sectional view of a heat treating apparatus according to an embodiment of the present invention.

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

Figure 2:
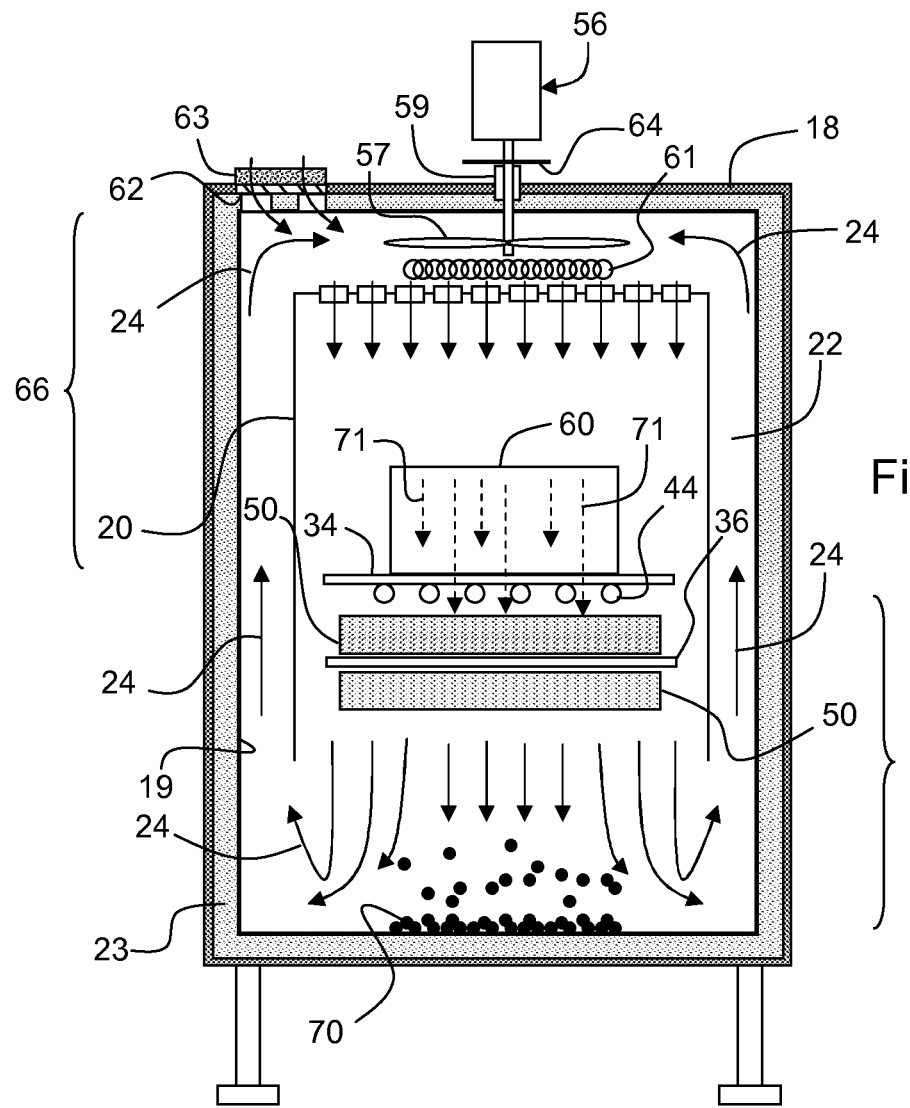
FIG. 2 is a lateral cross sectional view of the heat treating apparatus of FIG. 1.

FIGS. 1 and 2 show cross sectional views of an example of an apparatus for heat treating glass according to an embodiment of the present invention, and in particular an apparatus for heat treating a plurality of closely stacked thin glass sheets while reducing or eliminating particulate contamination of surfaces of the glass sheets. The apparatus is more commonly referred to as a lehr and is hereinafter designated lehr 10. Typically, glass sheets having dimensions of at least 500 mm×500 mm in size and having a thickness equal to or less than about 1.6 mm, and in some embodiments equal to or less than about 1.0 mm, equal to or less than about 0.7 mm, or equal to or less than about 0.3 mm may be heat treated, although the size of glass sheet heat treated will depend on need and the dimensions of the lehr.

Lehr 10 generally comprises an elongated box or enclosure 12 that terminates at an inlet end 14 and an outlet end 16. Enclosure 12 comprises outer wall 18, intermediate wall 19 and inner wall 20 positioned within the volume enclosed by outer wall 18. The space between inner wall 20 and intermediate wall 21 forms plenum 22 through which an air flow is circulated, as represented by arrows 24. The space between outer wall 18 and intermediate wall 19 is filled with insulating material 23. Insulating material 23 may be formed, for example, from glass or ceramic fibers. While outer wall 18 may be formed from any suitable structural steel or other metal, inner wall 20 and intermediate wall 21 are preferably formed from stainless steel, although other corrosion-resistant metals may be used, such as aluminized steel.

While both inlet end 14 and outlet end 16 may include doors for closing the inlet end and/or outlet end, the inlet end and outlet end doors, if present, are typically maintained open during operation of lehr 10 so that potential contact with glass sheets traversing through lehr 10 are not contacted. Thus, inlet end 14 and outlet end 16 represent openings into enclosure 12.

To provide for the cleanliness of the glass sheets, lehr 10 is provided with an air curtain represented by arrows 26 at both inlet end 14 and outlet end 16 of the lehr. The air curtains are provided by blowers (not shown) that direct air through one or more nozzles 28 positioned above each of the inlet end 14 and outlet end 16 of lehr 10. Preferably, the air curtain (i.e. the flow of air exhausting from the nozzles) comprises filtered air to minimize particulate carried to the glass sheets by the air curtain. To that end, each nozzle, or its associated ductwork and/or fan is equipped with a filter 30 for filtering the air before being exhausted from the nozzle.

To move the glass sheets through the lehr between inlet end 14 and outlet end 16, enclosure 12 is equipped with a conveyor system. The conveyor system includes a belt 32 that travels through the enclosure in a continuous loop, as well as a drive mechanism for moving the belt, and power supply and control system components for powering and controlling the belt movement. Lehr 10 further comprises a ventilation system for circulating heated air through the apparatus, and a heating and/or cooling system for heating and/or cooling the circulating air as needed.

Belt 32 is configured in a continuous loop and comprises an upper portion 34 and a lower portion 36. Glass sheets being heat treated are conveyed through enclosure 12 on upper portion 34 of belt 32. Belt 32 is driven by an appropriate drive mechanism comprising one or more electric motors (not shown) that drive a drum or sprocket 38 that engages with the belt and moves belt 32 such that upper portion 34 and lower portion 36 travel in opposite directions as indicated by arrows 40 and 42, respectively. Belt 32 may be selected from a variety of open (i.e. porous) designs having sufficient open porosity to allow a flow of air therethrough. For example, belt 32 is preferably a metal belt to withstand the temperatures present within the lehr enclosure (i.e. within inner wall 20) and may be, for example, a chain link belt, a woven wire mesh belt, a spiral cage belt, a stranded wire belt or any other suitable metal belt having an open porosity so as to allow a flow of air therethrough.

To support belt 32 as it travels through enclosure 12, a plurality of slides or skids 44 may be positioned beneath the upper portion 34 of belt 32, where belt 32 slides across the skids. In addition, rollers 46 may be provided at intervals along the length of the belt upper portion to further support the belt and aid its movement through the lehr.

The conveyor system may further comprise a cleaning system 48 comprising a brush 50 for dislodging debris, and at least a first vacuum inlet 52a connected to a vacuum source (not shown) for removing the dislodged debris. Brush 50 is preferably configured to rotate and is driven by an electrical motor (not shown) or other motive force (e.g. hydraulic motor) and positioned so the brush contacts an outside surface of lower portion 36 of belt 32. The speed of the electrical motor for driving brush 50 can be controlled, for example, by a controller. Preferably, the conveyor system also includes a second vacuum inlet 52b located adjacent to brush 50. For example, in some embodiments first vacuum inlet 52a may be positioned before brush 50 relative to a direction of travel of belt 32, while second vacuum inlet 52b is positioned after brush 50 relative to a direction of travel of belt 32. In some embodiments, brush 50 and the one or more vacuum inlets may be located within the loop of the belt so that the brush contacts an inside surface of lower portion 36 of the belt. In still other embodiments, two cleaning systems comprising brushes and vacuum intakes as described supra are located both outside the loop of the belt and inside the loop of the belt, thereby contacting the lower portion 36 of belt 32.

Lehr 10 is divided into a plurality of regions: a heat up region 54a, a hold region 54b and a cool down region 54c. The function of these regions will be described more fully below. It should be noted that although lehr 10 depicted in FIG. 1 shows only three regions, lehr 10 can include as many regions as necessary to achieve at least one cycle of heat up of the glass sheets at a predetermined rate of temperature change, a hold time at a predetermined temperature, and cool down at a predetermined rate of temperature change. During the temperature hold time both heating and cooling may occur so as to maintain a predetermined temperature within a given range. Each region can be further divided into one or more segments, wherein the temperature change within a segment can be adjusted to produce the overall temperature excursion for a region. For example, the heat up region can include multiple heat up segments, where each segment of the lehr is maintained at a given temperature in a series of discrete steps rather than a continuous increase. Such step-wise temperature change can also be applied to the cool down region.

Each region includes a plurality of fans 56 to circulate air, using blade 57, through each region. Preferably, the circulating air is re-circulated so that air that has flowed past the glass sheets is redirected to an inlet for the fan or blower and again directed past the glass sheets. As illustrated by FIG. 2 in respect of an arbitrary region, air from a fan 56 is directed downward toward belt 32. Glass sheets 58 are contained within a box or cassette 60 that comprises a plurality of slots or guides for holding the glass sheets.

Heat up region 54a and hold region 54b are preferably fitted with heating coils 61 to heat the incoming fresh air or recirculating air before it passes over and between glass sheets 58. In some embodiments heating coils 61 are preferably electrically heated, such as being electrical resistance heaters. In certain other embodiments fuel gas fired systems may be employed.

In addition, to ensure cleanliness of the glass traversing through enclosure 12, any air provided to the interior of the enclosure is filtered. For example, while fans 56 that provide the downdraft airflow within at least the heat up and hold regions of the lehr re-circulate air, additional air from outside the lehr may be provided to the fan inlets. Such additional air is passed through a filter before being provided to the interior of the enclosure where it may contact the glass sheets traversing therethrough. For example, air may be drawn into the enclosure through one or more vents 62 in outer wall 18, and a filter 63 is positioned at the vent or vents to filter the incoming air. Filter 63 is preferably capable of filtering the incoming are to HEPA class 1000 clean room standards. Fans provided for cooling in the cooling segment may also be provided with filters 63. In addition each fan 56 is provided with a disc-shaped drip shield 64 positioned on a shaft of each fan to prevent lubricant that might escape from the fan motor (e.g. bearing lubricant) from dripping through the opening through which the shaft penetrates outer wall 18 of the enclosure and potentially contaminating glass sheets 58 traversing through the lehr. Shafts of the fans 56 may further include sleeves 59 to further prevent lubricant from entering enclosure 12.

As air flows from upper portion 66 of enclosure 12 through belt 32 to lower portion 68 of enclosure 12, a volume change between the upper portion and the lower portion results in a large decrease in air velocity within the lower portion. The lower velocity of the air circulating through lower portion 68 results in particulate carried within the lower portion air stream to fall out of the air stream and collect at the bottom of the enclosure, as represented by reference numeral 70.

Cassette 60 is arranged on belt 32 so that each glass sheet 58 is oriented vertically in a closely spaced relationship with adjacent glass sheets 58. Preferably, the glass sheets are maintained substantially parallel to one another with a typical distance between adjacent glass sheets being between about 1 to 2 cm. Cassette 60 is sufficiently open to allow a flow of air downward through the cassette and between the glass sheets contained therein, as represented by arrows 71. For example, cassette 60 may have an open top and a mesh bottom, and include guides along the walls thereof to maintain the separate glass sheets in a consistent spaced-apart orientation.

Figure 3:
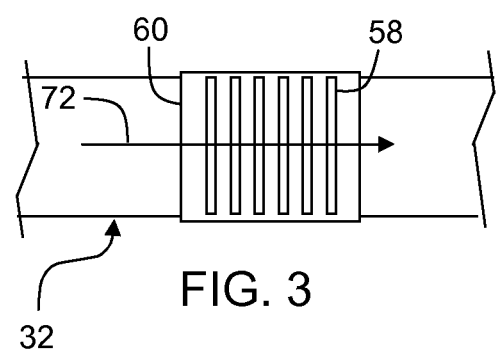
FIG. 3 is a top-down view of a cassette for transporting closely stacked, thin glass sheets in the heat treating apparatus of FIG. 1, and showing the arrangement of the glass sheets such that a plane of any one of the glass sheets is perpendicular to the direction of motion of the cassette on a traversing belt.

Additionally, glass sheets 58 within cassette 60 are oriented such that the planar major surfaces of the glass sheets are perpendicular to the direction of travel 72, of belt 32 as in FIG. 3. That is, because the temperatures within lehr 10 vary as a function of distance traveled by belt 32, cassette 60 is placed on belt 32 so that the thickness of each glass sheet is in the direction of travel 72 of belt 32 so that any temperature differential experienced by any given sheet is experienced only by the thickness of the sheet. Orienting the cassette so that the plane of a glass sheet was other than perpendicular to the direction of travel of belt 32 results in a portion of the glass surface over a length (or width) or the glass sheet may vary. For example, if the cassette was oriented on belt 32 so that a plane of a glass sheet 58 was parallel to the direction of travel 72 of belt 32 could result in a leading portion of the glass sheet relative to the direction of travel experiencing a first temperature simultaneously different from a trailing portion of the glass sheet relative to the direction of travel of belt 32. Simultaneous different temperatures across the sheet during the heat treating can lead to undesirable stress in the glass sheet at the conclusion of the heat treating.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method of heat treating glass sheets comprising:
 transporting a plurality of glass sheets through an enclosure on a continuously moving belt, the plurality of glass sheets being oriented in an upright position such that major surfaces of the glass sheets are substantially perpendicular to a direction of transport;
 directing a flow of heated air between the glass sheets, the heated air heating the glass sheets to a hold temperature, wherein the hold temperature is in a range from about 25° C. to about 45° C. below an anneal temperature of the glass sheets;
 maintaining the glass sheets at the hold temperature for a predetermined period of time;
 cooling the glass sheets after the predetermined period of time; and
 wherein the belt is cleaned by a rotating brush in contact with the belt as the glass sheets are transported through the enclosure.

2. The method according to claim 1, wherein a rate of heating the glass sheets is in a range from about 5° C./min to about 100° C./min.

3. The method according to claim 1, wherein a rate of heating the glass sheets is in a range from about 20° C./min to about 100° C./min.

4. The method according to claim 1, wherein the predetermined period of time is in a range from about 5 minutes to about 120 minutes.

5. The method according to claim 1, wherein the predetermined period of time is in a range from about 5 minutes to about 30 minutes.

6. The method according to claim 1, wherein the cooling rate comprises a plurality of cooling rates.

7. The method according to claim 1, wherein the cooling rate comprises an initial coiling rate in a range from about 1° C./min to about 5° C./min.

8. The method according to claim 1, wherein the cooling rate comprises an intermediate cooling rate in a range from about 5° C./min to about 20° C./min.

9. The method according to claim 1, wherein the cooling rate comprises an intermediate cooling rate in a range from about 5° C./min to about 10° C./min.

10. The method according to claim 1, wherein the cooling rate comprises a final cooling rate in a range from about 5° C./min to about 50° C./min.

11. The method according to claim 1, wherein a velocity of the heated air in a lower portion of the enclosure is lower than a velocity of the heated air in an upper portion of the enclosure.

12. The method according to claim 1, wherein the heated air is recirculated within the enclosure.

13. The method according to claim 1, further comprising forming an air curtain at an opening of the enclosure.

14. The method according to claim 13, wherein the air curtain is formed at an inlet of the enclosure through which the glass sheets pass.

* * * * *